(12) United States Patent
Brent et al.

(10) Patent No.: US 10,171,217 B2
(45) Date of Patent: Jan. 1, 2019

(54) ENHANCED SRS FOR MASSIVE MIMO CHANNEL ESTIMATION

(71) Applicants: Jason Brent, Mission Viejo, CA (US); Dengkui Zhu, Wanyuan (CN); Ping Liang, Newport Coast, CA (US)

(72) Inventors: Jason Brent, Mission Viejo, CA (US); Dengkui Zhu, Wanyuan (CN); Ping Liang, Newport Coast, CA (US)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 15/537,877

(22) PCT Filed: Jan. 16, 2016

(86) PCT No.: PCT/US2016/013750
§ 371 (c)(1),
(2) Date: Jun. 19, 2017

(87) PCT Pub. No.: WO2016/115548
PCT Pub. Date: Jul. 21, 2016

(65) Prior Publication Data
US 2018/0026765 A1     Jan. 25, 2018

Related U.S. Application Data

(60) Provisional application No. 62/104,639, filed on Jan. 16, 2015.

(51) Int. Cl.
*H04L 5/00*     (2006.01)
*H04B 7/04*     (2017.01)
(Continued)

(52) U.S. Cl.
CPC .............. *H04L 5/0048* (2013.01); *H04B 7/04* (2013.01); *H04B 7/0452* (2013.01);
(Continued)

(58) Field of Classification Search
CPC ... H04L 5/0048; H04L 5/0007; H04B 7/0452; H04B 7/0456; H04B 7/0617; H04B 7/0626; H04W 72/042
See application file for complete search history.

(56) References Cited

U.S. PATENT DOCUMENTS

2011/0235602 A1*   9/2011   Ji ........................... H04L 5/0007
                                                                                   370/329
2012/0252474 A1* 10/2012   Tiirola .................. H04L 5/0048
                                                                                   455/450

(Continued)

FOREIGN PATENT DOCUMENTS

JP     WO 2006112030 A1 * 10/2006           H04B 7/0417
WO    WO 2014077742 A1 *   5/2014           H04L 5/0026

*Primary Examiner* — Ian N Moore
*Assistant Examiner* — Latresa A McCallum
(74) *Attorney, Agent, or Firm* — Guosheng Wang; United States Patent and Research Firm

(57) ABSTRACT

This invention provides SRS transmission methods to meet the Massive MIMO systems requirements. These methods are described in two separate categories. Firstly, enhancements to multiplex more channels in the same resources for a given SRS transmission and to provide Massive MIMO throughput performance improvements. Secondly, scheduling enhancements to provide adaptive UE-specific scheduling based on channel conditions for each UE. These methods can be combined in different ways in each BS to optimize the channel estimation system capacity for a given level of system performance.

6 Claims, 3 Drawing Sheets

(51) Int. Cl.
*H04B 7/0452* (2017.01)
*H04B 7/0456* (2017.01)
*H04B 7/06* (2006.01)
*H04W 72/04* (2009.01)

(52) U.S. Cl.
CPC ......... *H04B 7/0456* (2013.01); *H04B 7/0617* (2013.01); *H04B 7/0626* (2013.01); *H04L 5/0007* (2013.01); *H04W 72/042* (2013.01)

(56) References Cited

U.S. PATENT DOCUMENTS

| | | | | |
|---|---|---|---|---|
| 2012/0257584 A1* | 10/2012 | Behravan | ................ | H04L 5/005 370/329 |
| 2012/0287900 A1* | 11/2012 | Seo | ................ | H04L 5/0051 370/329 |
| 2013/0343359 A1* | 12/2013 | Li | ................ | H04L 5/0048 370/336 |
| 2014/0126464 A1* | 5/2014 | Barrett | ................ | H04L 1/08 370/315 |
| 2014/0241242 A1* | 8/2014 | Josiam | ................ | H04W 88/02 370/328 |
| 2015/0208266 A1* | 7/2015 | Jung | ................ | H04L 5/00 370/252 |

* cited by examiner

ENHANCED SRS FOR MASSIVE MIMO CHANNEL ESTIMATION

This application claims the benefit of U.S. Provisional Application No. 62/104,639 filed on Jan. 16, 2015.

FIELD OF INVENTION

This invention relates generally to pilot/reference signals used in OFDMA wireless communications for channel estimation and more particularly to the sounding reference signal (SRS) used in LTE uplink and enhanced methods for use in Massive MIMO systems.

BACKGROUND

OFDMA wireless communications generally support multiple simultaneous users by scheduling each user a subset of the OFDM frequency band at different points in time. In downlink, the base station (BS) typically sends reference signals distributed across the whole frequency band in every scheduling period, so the user equipment (UE) can do frequent channel estimation for the whole frequency band, even though it may not be scheduled to receive any data in that time period or may only be scheduled to receive downlink data in a small portion of that band. However, for OFDMA uplink transmissions, a UE generally only sends reference signals in the portion of the frequency band allocated for its data transmission. LTE provides a sounding reference signal (SRS) mechanism for UEs to send wideband reference signals to allow the BS to do channel estimation for the uplink channel from each UE.

Base stations with multiple antennas and knowledge of the channel state can use beamforming to improve system throughput or capacity in bit/s/Hz. The SRS channel estimates can be used in constructing the precoding matrix for downlink transmissions and can be used in constructing the detection matrix for uplink reception. It is required to periodically refresh the channel estimates, since the wireless channel changes over time. The channel state is considered to be only valid for providing beamforming gain in the precoding or detection matrix for the "coherence time period" and the beamforming gain achievable gradually decreases as time delay after channel estimation increases. The coherence time is different for each user within a specific wireless network and depends on UE speed of motion.

Massive MIMO systems increase system data throughput capacity by increasing the number of users simultaneously sharing the same time and frequency resources in both uplink and downlink data transmission periods. There is a need to correspondingly increase the system capacity for channel estimation from SRS transmissions, in terms of the number of users per SRS transmission and the rate of update per user relative to the coherence time. PCT patent application PCT/US15/56500 entitled "Methods for Channel Information Acquisition, Signal Detection and Transmission in Multi-User Wireless Communication Systems" filed on Oct. 20, 2105 (claiming the benefit of U.S. Provisional Application No. 62/065,775, filed on Oct. 20, 2014) has shown that optimal performance in a Massive MIMO system requires perfect knowledge of the following channel characteristics at the instant of applying the precoding or detection matrix; symbol time offset between each UE and the base station, carrier frequency offset between each UE and the base station and the CSI (channel state information) for the multipath fading channel between each UE and BS antenna. Moreover, in a practical system, there is a time delay between calculating these matrices and applying them, so it also follows that for optimal performance, the BS needs perfect knowledge of the UE speed, since this affects the coherence time.

This invention describes SRS transmission methods that are enhanced relative to current LTE Rel.12 SRS transmission methods to meet the Massive MIMO requirements described above. These enhancements are described in two separate categories. Firstly, enhancements to multiplex more channels in the same resources for a given SRS transmission and to provide Massive MIMO throughput performance improvements. Secondly, scheduling enhancements to provide adaptive UE-specific scheduling based on channel conditions for each UE. These methods can be combined in different ways in each BS to optimize the channel estimation system capacity for a given level of system performance.

DETAILED DESCRIPTION OF THE PRESENT INVENTION

The detailed description below is intended to highlight the SRS enhancements claimed in this invention relative to the current state of the art SRS used in LTE Rel.12. It is not intended as a full and complete system description. General signal processing techniques and other applications for this invention not mentioned here will be apparent to those skilled in the art. The particular techniques and implementations described are merely exemplary and are not intended to limit the scope of the invention in any way.

The first category of SRS enhancement, that multiplexes more channels for a given SRS transmission and improves channel estimation performance, is now described.

Figure 1:
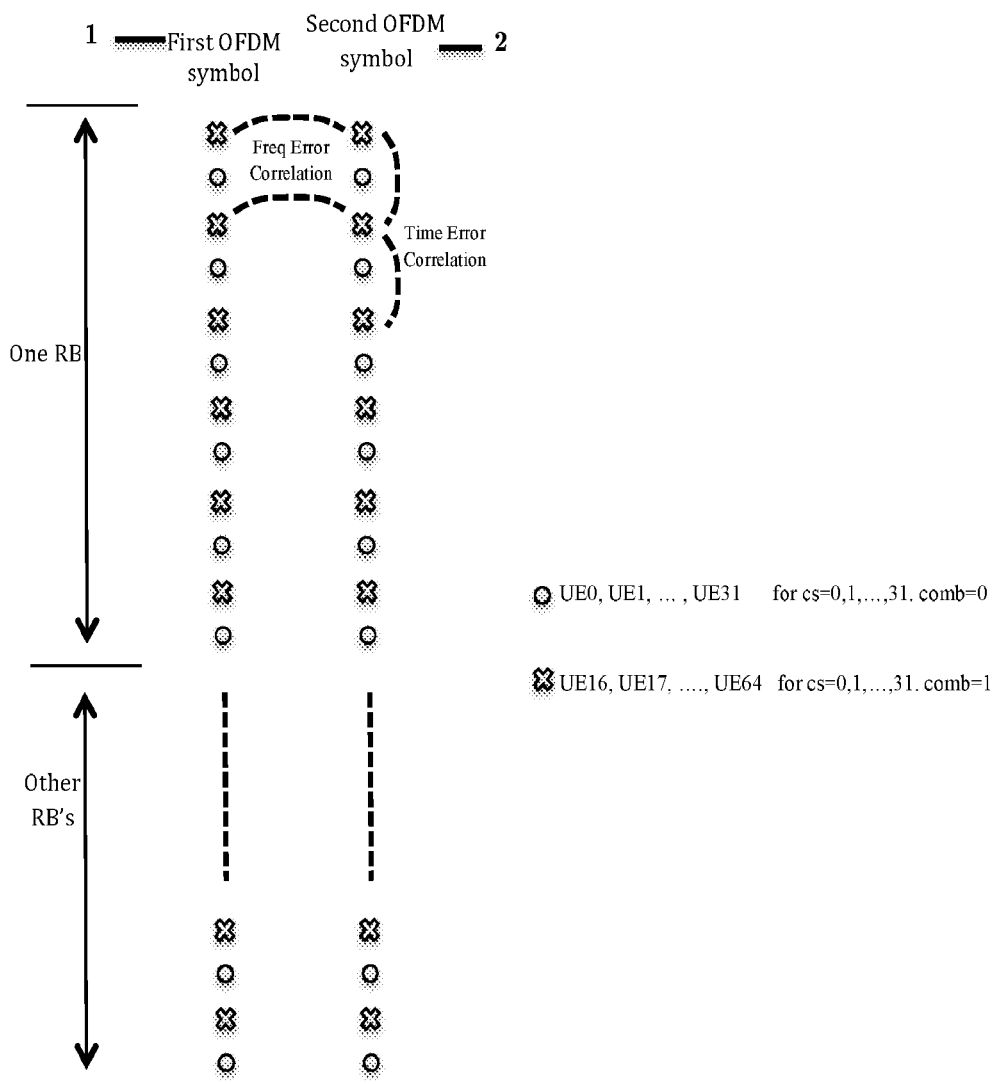
FIG. 1 shows the time and frequency structure of SRS transmissions, illustrating the method of estimating time and frequency offsets and the different methods of multiplexing many UEs in each RB.

FIG. 1 shows an example of the frequency domain structure of enhanced SRS symbols 1, 2 according to this invention. Uplink LTE [1] sends SC-FDMA symbols at a rate of 14000 symbols per second. Each SC-FDMA symbol contains subcarriers spaced 15 kHz apart arranged in RBs (resource blocks), where each RB has 12 subcarriers per SC-FDMA symbol. The number of RBs and so subcarriers used depends on the channel bandwidth as shown in Table 1 below.

TABLE 1

| LTE Channel Bandwidth | Number of RBs | Number of subcarriers per symbol |
| --- | --- | --- |
| 1.4 MHz | 6 | 72 |
| 3 MHz | 15 | 180 |
| 5 MHz | 25 | 300 |
| 10 MHz | 50 | 600 |
| 15 MHz | 75 | 900 |
| 20 MHz | 100 | 1200 |

The LTE uplink SRS reference signal values for each UE are allocated to these subcarriers. If a conventional SISO or SIMO transmission method was used for SRS, every subcarrier location and every RB would only be allocated to a single UE. LTE provides a MIMO transmission mechanism for SRS, where multiple UEs can be allocated to the same RB with mechanisms that allow channel estimates from each UE to be separated in the BS receiver. With the enhanced SRS signal shown in the FIG. 1 example, a "cyclic shift" MIMO mechanism is used to multiplex 32 UEs onto the same subcarrier and a "comb" SISO/SIMO mechanism is used to multiplex 2 sets of cyclic-shifted UEs in the same RB. Additionally, not shown in FIG. 1, an "orthogonal code" MIMO multiplexing method can be used with N SRS symbols to get a single channel estimate per subcarrier with a further multiplexing factor of N UEs. These three multiplexing methods are described below.

Figure 2:
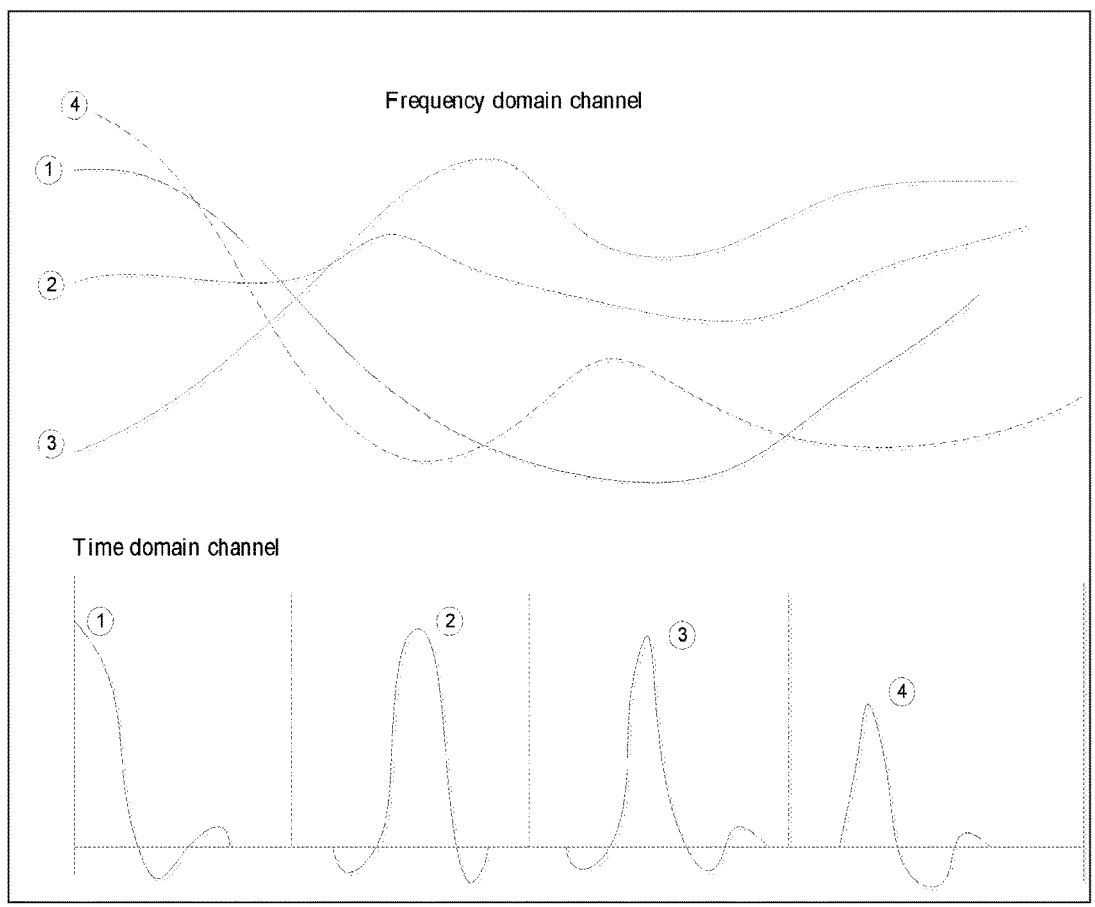
FIG. 2 illustrates the concept of channel separation using the cyclic shift.

"Cyclic shift" MIMO multiplexing mechanism is used in FIG. 1 to combine 32 UEs onto the same set of subcarriers. The principle for separating channel estimates from multiple users within a single SC-FDMA symbol using cyclic shift is shown in FIG. 2. In accordance with the current LTE standard defined in [1, Sec.5.5.1], the reference signal sequence sent by all 32 cyclic shifted UEs, $r_{u,v}^{(\alpha)}(n)$ is defined by a cyclic shift $\alpha$ of a base sequence $\bar{r}_{u,v}(n)$ according to $$r_{u,v}^{(\alpha)}(n) = e^{j\alpha n} \bar{r}_{u,v}(n), 0 \le n \le M_{sc}^{RS}$$

Where, all 32 UEs send the same Constant Amplitude Zero Auto Correlation (CAZAC) base sequence $\bar{r}_{u,v}(n)$ and each UE has a unique value of $\alpha$. $M_{sc}^{RS} = mN_{sc}^{RB}$ is the length of the reference signal sequence and $1 \le m \le N_{RB}^{max,UL}$. $N_{sc}^{RB} = 12$ subcarriers in an RB and $N_{RB}^{max,UL}$ is the number of RBs in an SC_FDMA symbol for the LTE channel bandwidth as defined in Table 1 above. The value of $\alpha$ for the K=32 cyclic shifted UEs in FIG. 1 is given by $\alpha_k = 2\pi k/32$.

The ideal channel model for the $n^{th}$ subcarrier in the frequency domain between any one UE transmit antenna and BS receive antenna can be closely approximated as $$r(n) = h(n)s(n)$$

Where, r(n) is the complex-valued received signal, s(n) is the known, unity gain, complex-valued CAZAC reference signal and h(n) is the complex-valued CSI for subcarrier n. Consider the case where the K=32 cyclic shifted UEs are scheduled to use all RBs in a 20 MHz LTE channel. UE0 uses k=0, UE1 uses k=1 etc. After the FFT, the BS received reference signal value in the $n^{th}$ subcarrier of the SRS signal on a single receive antenna is $$r(n) = \sum_{k=0}^{K-1} h_k(n) s_k(n) = \sum_{k=0}^{K-1} h_k(n) \cdot e^{j\alpha_k n} \bar{r}_{u,v}(n) = \sum_{k=0}^{K-1} h_k(n) \cdot e^{j2\pi \frac{k}{32} n} \cdot \bar{r}_{u,v}(n)$$

Dividing the received sample value for each subcarrier by the known CAZAC sequence value $\bar{r}_{u,v}(n)$ is implemented by multiplying r(n) by the complex conjugate value of $\bar{r}_{u,v}(n)$. Giving, for the $n^{th}$ subcarrier $$\hat{r}(n) = \sum_{k=0}^{K-1} h_k(n) \cdot e^{j2\pi \frac{k}{32} n}$$

Since, $\bar{r}_{u,v}(n) \bar{r}_{u,v}^*(n) = |\bar{r}_{u,v}(n)|^2 = 1$, for unity gain CAZAC sequence $\bar{r}_{u,v}(n)$, where $\bar{r}_{u,v}^*(n)$ denotes the complex conjugate value of $\bar{r}_{u,v}(n)$.

So, the frequency domain value of any individual resource element, $\hat{r}(n)$, contains the sum of all channel estimates, which means that it is impossible to separate individual channel estimates directly from $\hat{r}(n)$ in the frequency domain.

Note that the subcarrier values $\hat{r}(n)$ (in the frequency domain) for any individual channel k, are "$e^{j2\pi \frac{k}{32} n}$ × the frequency response of the channel".

From the well-known DFT (discrete Fourier transform) shift theorem, the $M_{sc}^{RS}$-point IDFT of this sequence gives the impulse response of the channel cyclically shifted by $$\frac{k}{32} M_{sc}^{RS} \text{ samples.}$$

So, as long as the impulse response of the channel is less than $M_{sc}^{RS}/32$ samples, the IDFT gives all 32 channel impulse responses separated in their own time window of $M_{sc}^{RS}/32$ samples.

Figure 3:
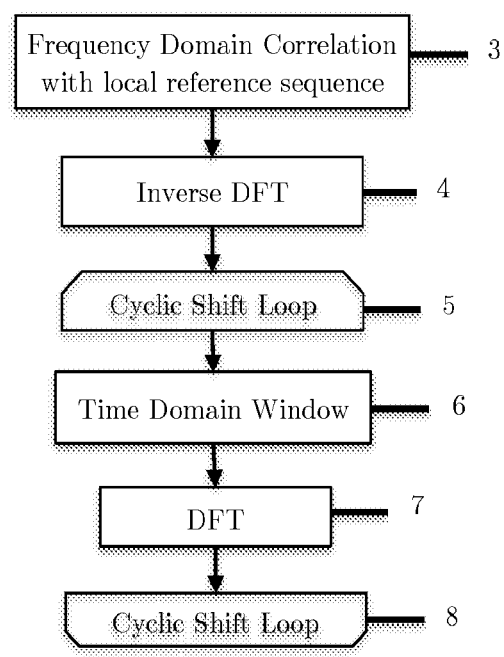
FIG. 3 is a flow chart describing the series of algorithm steps for channel separation using cyclic shift.

FIG. 3 shows the sequence of operations for MIMO channel separation using cyclic shift. i.e.
1. Correlate the frequency domain received reference signals r(n) with $\bar{r}_{u,v}^*(n)$, where * represents complex conjugate 3
2. Calculate the $M_{sc}^{RS}$-point inverse DFT 4
3. Loop, for each channel k, 5
   a) Extract the impulse response from its window of length $M_{sc}^{RS}/32$ time domain samples and Set all other time domain samples to zero 6
   b) Calculate the $M_{sc}^{RS}$-point DFT to get the frequency domain channel estimates for this channel, separated from all other channels 7.
4. End loop. 8

Typically, a window function or other signal processing function would be used to improve the SNR performance of this procedure.

"Comb" SISO/SIMO multiplexing mechanism is used in FIG. 1 to combine a second set of 32 cyclic-shifted UEs into the same RB as the first set of 32 UEs, using interleaved odd and even samples UE sets. There is no interference between the odd-sample UE set and the even-sample UE set, but the maximum length of each set is now reduced to half of the maximum sequence length for the LTE bandwidth ($N_{RB}^{max,UL}/2$), so is limited to half the number of RBs defined for the LTE channel bandwidth in Table 1 above. According to this invention, different values of the comb can be selected, including: 1 (no comb), 2, 3, 4, 6, 12, 24.

"Orthogonal code" MIMO multiplexing mechanism can also be used with enhanced SRS in this invention to combine channel estimates from multiple, say N, SRS symbols to get a single channel estimate per subcarrier and multiplex N times more users on each SC-FDMA symbol. Consider the two-symbol SRS example shown in FIG. 1 with 128 UEs transmitting in both SRS symbols. Assume in this example that the first 64 UEs defined above, multiply their SRS reference signal sequences with orthogonal code [1,1] and the second set of otherwise identical 64 UEs multiply their SRS reference signal sequences with orthogonal code [1,-1]. Adding channel estimates at each subcarrier position across both symbols gives channel estimates for the first set of 64 UEs, the second set cancel to zero (assuming ignorable change in subcarrier channel estimates between the two SRS symbols). Similarly, subtracting channel estimates at each subcarrier position of the $2^{nd}$ SRS symbol from the first gives channel estimates for the second set of 64 UEs, the first set cancel to zero. Although it would be possible to assign a different 64 UEs to each SRS symbol, giving a total of 128 UEs from these two symbols, 64 estimated from each symbol. The method described here with orthogonal code has the advantage that the average channel estimate per subcarrier for each UE from two SRS symbols is generally more accurate than for channel estimates from an individual symbol, the gain from averaging being more than the loss from orthogonal channel code separation.

With the enhanced SRS signal shown in FIG. 1, once SIMO and MIMO signal separation has been applied in the receiver, the BS has independent frequency domain channel estimates for every transmission path between UE antenna and BS antenna at every subcarrier position transmitted. For the purposes of the following analysis, this channel estimate is assumed to consist of three independent components, which all need to be estimated accurately to optimize Massive MIMO system performance; the underlying "CSI" (channel state information), "frequency offset" and "time offset".

It is known [U.S. Pat. No. 689,172B1] that "frequency offset" and "time offset" between each UE transmitter and BS receiver can be estimated from the independent frequency domain channel estimates calculated above, using the principles illustrated in FIG. 1. Frequency offset causes a constant phase rotation with time in the frequency domain channel estimates. Correlation between subcarrier values at different OFDM symbols gives a measure of the frequency offset. Time offset causes a constant phase rotation with frequency in the frequency domain channel estimates. Correlation between subcarrier values at different frequencies gives a measure of the time offset. FIG. 1 shows frequency offset correlation is calculated between subcarriers at the same frequency, so unbiased by time offset. Similarly, time offset correlation is calculated between subcarriers at the same SC-FDMA symbol, so unbiased by frequency offset. In both cases, the sum of correlations between many subcarriers improves the accuracy of the estimate.

For frequency offset estimation, the two SC-FDMA symbols used for correlation do not have to be adjacent in time. But the time duration between these symbols defines the maximum frequency offset that can be unambiguously estimated with this method. Where the two SRS symbols in FIG. 1 are separated in time by $\Delta_t$ sec, frequency offsets up to $1/\Delta_t$ Hz can be estimated.

Once time and frequency offset are estimated, their effects can be removed from the channel estimates by corresponding de-rotation in time and frequency directions, relative to a reference subcarrier position in time and frequency. For example, the lowest subcarrier frequency in the first SC-FDMA SRS symbol can be chosen as the reference. Once de-rotation is applied, the underlying CSI values for each subcarrier are estimated. Massive MIMO performance tests have shown [PPA1], for most channels of interest, that the underlying CSI values, after removal of time and frequency offset, do not change substantially between adjacent subcarriers in time and frequency. Moreover, those tests have shown that better Massive MIMO performance can be obtained by averaging the CSI value over 1 or more RBs and using a single precoding matrix over that set of subcarriers for downlink transmissions and a single detection matrix over that set of subcarriers for uplink transmissions. Where time and frequency offset effects are compensated with the application of a separate diagonal matrix per subcarrier.

The SRS enhancements in this exemplary embodiment compared with state of the art LTE Rel.12 SRS are as follows:

LTE Rel.12 SRS only sends one SRS OFDM symbol at a time. Absolute carrier frequency offset between UE and BS cannot be estimated from a single SRS symbol. Enhanced SRS according to this invention can send two adjacent SRS symbols or two symbols close enough to each other in time that the highest frequency of interest can be unambiguously estimated as described above. Rel.12 LTE [2] supports carrier frequencies up to 3.8 GHz with UE frequency accuracy of +/−0.1 ppm. So, absolute frequency error in carrier frequency in the range +/−380 Hz must be tolerated in the BS receiver, in addition to the maximum Doppler shift due to UE motion. Although 380 Hz frequency offset could be unambiguously measured as described above with two SRS symbols separated by <=1/380=2.6 ms, enhanced SRS in this invention providing two SRS symbols next to each other, or generally in the same TTI, avoids the cost of holding estimated subcarrier values in memory from previous TTI's. Also, supports the estimate including additional Doppler shift without restrictions, including the high speed train channel models in [1]. Provision of multiple SRS symbols per TTI can be provided for LTE according to this invention in multiple ways; For TDD special subframe, according to [1] Table 4.2-1, there are already configurations where two adjacent SRS symbols can be sent in UpPTS sequences of length 4384.Ts. The special subframe can be modified to extend the length of UpPTS with corresponding decrease in length of DwPTS, to give more SRS transmission opportunities. For FDD and TDD normal uplink subframes in LTE Rel.12, SRS is sent only in the last symbol of the subframe. This could be modified, for example, to send optionally in the last two symbols of the subframe or in the last symbol of both slots.

LTE Rel.12 SRS only allows a maximum of 8 cyclic shifts per symbol. Enhanced SRS according to this invention can send as many cyclic shifts as can be practically supported by the cell-specific characteristics of each base station. The number of cyclic shifts that can be supported in theory, for non-overlapping channel estimates in the time domain, depends on the time delay spread of the channel (and maximum time offset). The time delay spread of the channel is generally in proportion to the cell size and the approximate cell size is usually known when the BS is configured.

For LTE, the largest cell sizes give a time delay spread approximately equal to the cyclic prefix length. For 20 MHz LTE, normal cyclic prefix, the FFT/IFFT has 2048 useful time delay samples per symbol (duration 67 µs) and 144 samples of cyclic prefix (duration 4.7 µs). 2048/144=14.22, giving up to 14 cyclic shifts for SRS.

Small cell channel models applicable to LTE have significantly smaller time delay spreads. For example, the Indoor Hotspot ITU model in [3] has only 130 ns time delay spread. 67000/130=515.38, giving, in theory up to 515 cyclic shifts for SRS without overlapping time domain impulse responses. In practice, good performance in cyclic shift channel separation requires good resolution of the time domain sampled impulse response. Assume a comb value of 2 as in FIG. 1. Then the 600-point inverse DFT in step 2) of the cyclic shift channel separation procedure defined above, with 512 cyclic shifts would only give 600/512=1.17 time domain samples per cyclic shift window. This is not enough resolution for good performance. Though in many cases, 10 to 20 time domain samples per cyclic shift window may be enough resolution for good performance, giving correspondingly between 60 and 30 non-overlapping time domain impulse responses and so 60 to 30 UEs multiplexed with cyclic shift and comb of 2. Enhanced SRS according to this invention increases the number of cyclic shifts allowed, supporting many more UEs multiplex on small cells and supporting optimization for the given channel conditions by each individual BS.

LTE Rel.12 SRS has a fixed comb of 2. Enhanced SRS in this invention allows the comb setting to be increased or removed by each base station.

The combined settings of number of cyclic shifts and comb size can be seen as a single complex optimization problem that can be jointly optimized in the BS to maximize the number of UEs per SRS symbol for a given level of throughput performance in a Massive MIMO system, for a given cell configuration. For example, cells with smaller LTE bandwidth have shorter FFT/IFFT length so less resolution in the time domain. Bigger comb size and smaller number of cyclic shifts may work better for a 3 MHz carrier than for 20 MHz carrier, for a cell in a given location.

LTE Rel.12 does not use orthogonal codes for SRS—since it does not support multiple SRS symbols per TTI. PUCCH uses orthogonal codes. These could be used to increase the number of UE channel estimates per SRS symbol, for users which already have frequency offset estimates. The frequency offset will only change very slowly relative to the coherence time of the channel. So once the absolute carrier frequency offset between UE and BS has been calculated from two SRS symbols, on subsequent SRS transmissions, it may be sufficient to do a fine adjustment, measuring the relative frequency offset from the previous measured value. This could be done with a single SRS channel estimate at each subcarrier for those users. So orthogonal codes in the enhanced SRS in this invention can be used in this way to further increase the number of UEs multiplexed in SRS.

The second category of SRS enhancement in this invention, which provides for adaptive UE-specific scheduling based on channel conditions for each UE, is now described.

Estimates of UE speed of motion in the BS PHY can be used to adjust SRS periodicity per user. LTE SRS transmissions can be scheduled with user-specific periodicity. The rate of updating channel estimates for each user for optimal beamforming performance depends on the coherence time for that user, which correlates with UE speed. The faster the speed, the shorter is the coherence time. Faster UEs would be scheduled more often than slower UEs for optimal system throughput.

Extra SRS scheduling opportunities can be allocated in time periods where no uplink data transmissions are scheduled. LTE SRS transmissions could optionally be allowed in all uplink subframes and in all symbols. So, for subframes where no UE uplink data transmissions are scheduled, some or all of the symbols in that subframe can be allocated for SRS transmissions. This can be handled with procedures similar to existing uplink scheduling methods. Every UE that sends LTE uplink data in a subframe is previously scheduled to do so by the BS. Where no uplink data is scheduled, those same scheduling resources could be used to schedule SRS with the same latency as for scheduling data.

A fast SRS scheduling procedure can be added to LTE to provide the most up to date channel estimates for optimal downlink beamforming performance. This would increase downlink latency, since the full cycle of; {scheduling SRS for a UE, transmitting the SRS scheduling information from BS to UE, detection of scheduling request in the UE, sending SRS from that UE, detection of SRS with channel estimation in BS and precoding matrix calculation} would all have to complete before downlink data could be sent to that UE. This method would be applied where the quality-of-service requirement for downlink throughput outweighs the requirement for low latency.

Extra SRS scheduling opportunities can be allocated in the data symbols of downlink TDD subframes where no data is scheduled. This would make use of the fast SRS scheduling mechanism mentioned above or an earlier scheduling period for uplink data, since the LTE scheduling information for downlink data is sent in the control symbols in the same subframe as the downlink data so would arrive too late to schedule uplink SRS in that same subframe.

A BS with TDD echo canceling capability could allocate uplink SRS transmissions in downlink subframes while it is concurrently sending downlink data. This method would also need to make use of UE location knowledge in the BS to avoid UE to UE interference. The UE sending SRS in a TDD downlink subframe would interfere with a nearby UE receiving its downlink data at the same time.

Two symbols of SRS are sent from the same user close together in time to allow frequency offset estimation, critical for Massive MIMO performance. SRS symbols can be sent in pairs in the special subframe for TDD to support a new frequency offset calculation. Single SRS symbols sent, as in the current LTE FDD standard, can be used to compare with previous stored CSI to update the frequency offset estimate. LTE FDD could be modified to send 2 SRS symbols per subframe, to support frequency offset calculation for Massive MIMO.

One embodiment uses channel separation by cyclic shift, with a configurable number of cyclic shifts that can be optimized for cell size, to maximize the number of users sending pilots on the same resources that can be separated in the time domain. More received pilots per user than possible with dedicated reference subcarriers gives better time offset estimation, critical for Massive MIMO performance. Another method use a configurable "comb"=1, 2 (like SRS), 3, 4, 6, 12, to multiplex more users per SRS symbol.

Different "orthogonal codes" in UEs with the same cyclic shift and comb parameters can be used to further increase the number of multiplexed users, in cases where a single SRS symbol is sufficient for each UE. For example, where absolute frequency offset has already been calculated and frequency offset measurement relative to the current update is sufficient.

Methods of cyclic shift, comb and orthogonal code can be combined in different ways to give each BS total flexibility to optimize; the number of multiplexed SRS users, rate of update of CSI, system throughput performance etc. for a given system configuration and channel conditions.

Wideband SRS is best for combining most concurrent channels at once, since there is a practical limitation on cyclic shift separation with sequence length. For uplink, reference signals sent along with the data could be used for channel estimation, but generally data resources are allocated for a user for less than the full bandwidth, so generally worse (noisier) channel estimate and fewer concurrent users can be supported than for wideband SRS.

For uplink, lower latency can be achieved using previously sent SRS rather than using reference signals in the data subframes. Using previously sent SRS, the detection matrix can be pre-calculated ready for use as soon as the first data symbol arrives for that user.

A fast MAC-layer mechanism to request uplink SRS transmission from a user due to be scheduled soon for downlink transmission. For instances where extra latency is acceptable tradeoff for better CSI (so higher throughput) downlink.

UE speed estimation can be used to adjust the frequency of aperiodic SRS transmission, to update CSI for faster moving users more often that slower moving users in the same cell.

Schedule extra SRS symbols in uplink subframes whenever bandwidth is available. In LTE, all data sent uplink is known in the BS 4 ms ahead of time, since UE's sending uplink data need to be scheduled ahead of time. SRS can be scheduled like data, not needing a fast mechanism as in the previous claim.

For a TDD base station with echo canceller, UE's can send more SRS in the guard time. Also, carefully scheduled UEs that don't interfere with each other can send SRS when not receiving.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method for multiplexing a plural of UEs on the same resource element, comprising:
    using SRS transmission to estimate the uplink channel coefficients of each UE and to implement Time Offset and Frequency Offset (TO and FO) compensation in a MU-MIMO wireless communication system; wherein $N_{SRS}$ ($N_{SRS} \geq 1$) symbols (SRS symbols) are reserved specially for SRS transmission in an uplink subframe; and
    the method further comprising dividing the $N_{use}$ useable subcarriers of a SRS symbol into $M_{Comb}$ ($M_{Comb} \geq 1$) non-overlap sets or combs, where $K_{UE}^1$ ($K_{UE}^1 \geq 1$) are multiplexed on a comb through code division multiplexing (CDM), frequency division multiplexing (FDM), or a combination of these two multiplexing methods.

2. The method claim 1 further comprising the same $K_{UE}^1$ UEs are scheduled on the same comb of the $N_{SRS}$ SRS symbols with the same multiplexing method in each symbol.

3. The method in claim 1 further comprising the numbers $M_{Comb}$ and $K_{UE}^1$ is adaptively configured by the BS according to the application scenario such as cell size, the maximum channel delay spread, the system bandwidth, the number of UEs to be served.

4. A method for multiplexing a plural of UEs on the same resource element, comprising:
    using SRS transmission to estimate the uplink channel coefficients of each UE and to implement Time Offset and Frequency Offset (TO and FO) compensation in a MU-MIMO wireless communication system; wherein $N_{SRS}$ ($N_{SRS} \geq 1$) symbols (SRS symbols) are reserved specially for SRS transmission in an uplink subframe; and
    the method further comprising dividing the useable subcarriers of a SRS symbol into $M_{Comb}$ ($M_{Comb} \geq 1$) non-overlap sets or combs, where $K_{UE}^2$ ($K_{UE}^2 \geq 1$) are multiplexed on a comb across the $N_{SRS}$ SRS symbols through code division multiplexing (CDM), frequency division multiplexing (FDM), time division multiplexing (TDM), or a combination of the three multiplexing methods.

5. The method in claim 4 further comprising multiplexing $K_{UE}^2$ UEs through CDM is implemented by $K_{UE}^2$ orthogonal sequences with a length of $$L = \frac{N_{use} N_{SRS}}{M_{Comb}},$$

where each sequence is constructed by multiplying a sequence $s_F$ of length $$\frac{N_{use}}{M_{Comb}}$$

in the frequency domain with a cover sequence $s_T$ of length $N_{SRS}$ in the time domain or is formulated as $s=s_F \otimes s_T$ or $s=s_T \otimes s_F$.

6. The method in claim 4 further comprising the numbers $M_{Comb}$ and $K_{UE}^2$ is adaptively configured by the BS according to the application scenario such as the cell size, the maximum channel delay spread, the system bandwidth, the number of UEs to be served.

* * * * *